(12) United States Patent
Bouhelal et al.

(10) Patent No.: US 7,524,901 B1
(45) Date of Patent: Apr. 28, 2009

(54) RECYCLABLE ISOTACTIC POLYPROPYLENE

(76) Inventors: Said Bouhelal, c/o Bush Lewis, PLLC, 1240 Orleans St., Beaumont, TX (US) 77701; Kenneth W. Lewis, c/o Orleans St., Beaumont, TX (US) 77701

( * ) Notice: Subject to any disclaimer, the term of this patent is extended or adjusted under 35 U.S.C. 154(b) by 227 days.

(21) Appl. No.: 11/487,896

(22) Filed: Jul. 17, 2006

Related U.S. Application Data

(63) Continuation-in-part of application No. 11/192,890, filed on Jul. 29, 2005, now Pat. No. 7,241,844, which is a continuation-in-part of application No. 10/473,351, filed as application No. PCT/DZ02/00001 on Apr. 22, 2002, now Pat. No. 6,987,149.

(51) Int. Cl.
*C08C 19/20* (2006.01)

(52) U.S. Cl. .................... 525/354; 525/345; 525/343; 525/348

(58) Field of Classification Search ............. 525/345, 525/354, 343, 348
See application file for complete search history.

(56) References Cited

U.S. PATENT DOCUMENTS 3,806,558 A * 4/1974 Fischer ...................... 525/198

* cited by examiner

*Primary Examiner*—Ling-Siu Choi
(74) *Attorney, Agent, or Firm*—Buskop Law Group, PC; Wendy Buskop

(57) ABSTRACT

An easily recyclable cross-linked isotactic polypropylene that is additionally miscible with polyethylene is formed from a chemical reaction of combining a polymer, sulfur, peroxide, an accelerator, and at least one additive. The polymer can be mixtures of isotactic polypropylene homopolymer with an elastomer; mixtures of isotactic polypropylene homopolymer with thermoplastic-based mixes; mixtures of isotactic polypropylene copolymer with an elastomer; mixtures of isotactic polypropylene copolymer with thermoplastic-based mixes; or combinations thereof. The accelerator can be a sulfur accelerator.

1 Claim, No Drawings

RECYCLABLE ISOTACTIC POLYPROPYLENE

CROSS REFERENCE TO RELATED APPLICATIONS

The present application is a Continuation-in-Part of U.S. patent application Ser. No. 11/192,890, filed on Jul. 29, 2005, (now U.S. Pat. No. 7,241,844, issued on Jul. 10, 2007) which is a Continuation-in-Part to U.S. patent application Ser. No. 10/473,351, filed on Sep. 30, 2003, (now U.S. Pat. No. 6,987,149, issued on Jan. 17, 2006) which is the national phase application claiming priority to PCT/DZ02/00001 filed on Apr. 22, 2002.

FIELD

The present embodiments relate to recyclable polymers usable for plastic storage containers, durable packaging, bottles, car parts, film liners for ditches and ponds, carpet packing, outdoor posts, fences and parking lot vehicle stops, and furniture.

BACKGROUND

Recent developments in the art of polymerization have enabled the production of solid, amorphous polypropylene and co-polymers of ethylene and propylene that have many of the physical characteristics of rubber and, in fact, can be used as an improved replacement for rubber in many applications. These amorphous polymers and co-polymers are thermoplastic and soluble in many organic solvents. Like rubber, these polymers and co-polymers have to be cross-linked, i.e. vulcanized, in order to render the polymers and co-polymers useful for many of the intended uses.

Almost all of the plastic resin sold in today's market is in the form of pellets. Plastic resins are sold in the form of pellets to improve transportation, handling, safety and end-user material processability characteristics. Reactor granular resin is thus melted and extruded and made to flow through dies before being cut into pellets. The extrusion process serves as a step for the addition of performance additives for the required stability and material properties. The size, shape, and uniformity of the pellets are important and measurements of these pellet characteristics are standard quality assurance/quality control (QA/QC) tests to be met during production. The pelletizing step is important from an operational standpoint. Any upset or malfunction of the pelletizer can result in process shutdown and halt manufacturing with serious financial consequences, especially for large extrusion lines. The pelletizing step becomes an important component of the production line of any polyolefin production facility. The pelletizing step is not to be taken lightly in cases where the polymer renders difficult to cut.

A need exists for a polypropylene which is isotactic and easily recyclable.

The embodiments address these needs.

DETAILED DESCRIPTION OF THE EMBODIMENTS

Before explaining the present embodiments in detail, it is to be understood that the embodiments are not limited to the particular descriptions and that it can be practiced or carried out in various ways.

The embodiments relate to a chemical reaction to form an easily recyclable cross-linked isotactic polypropylene that is additionally miscible with polyethylene. Cross-linked plastics do not easily melt and, therefore, it is difficult to reprocess them or mix them with other polymers. Only polymers with reversible cross-linking can be reprocessed.

A typical procedure for the preparation of a reversible isotactic cross-linked polypropylene (recyclable miscible polypropylene) of the invention comprising mixing in the indicated proportions, olefin resin in a Brabender mixer for a temperature and a time sufficient to melt the resin.

Additional ingredients are added and mixing is continued until a maximum consistency is reached. As an example, the mixing time can range between about one minute to about ten minutes.

Ingredients can be added, such as peroxide and sulfur in the amounts noted below along with various accelerators. The resulting isotactic polymer is produced at only a nominal cast above the present cost of non-cross-linked isotactic polypropylene.

The cost for manufacturing is kept down through use of accelerators including tetramethyl thiuram disulfide (TMTD), as well as tetramethyl thiuram monosulfide (TMTM), and dibenzothiazole Disulfide (MDTS).

The isotactic polymer monomer can be one with a melt index of between 0.3 gm./10 min and 12 gm/10 min, a specific gravity of 0.910 to 0.905, and ultimate elongation of between 100% and 600%, a tensile strength at yield of 360 $Kg/cm^2$.

Embodiments contemplate a technique for cross-linking by mixing catalyst, peroxide and sulfur, to the monomer mixture and then extruding the mix at a molten state with the desired combinations.

The resulting cross-linked polypropylene can be recycled many times with the same extruder using the same operating conditions. Any peroxide with a decomposition temperature greater that 140 degrees Celsius can be used in cross-linking.

The embodiments concern methods for cross-linking isotactic polypropylene, both as homopolymer and as copolymer. The cross-linking reaction provides the polypropylene with new morphological structures that give it enhanced strength while being recyclable at low temperatures.

The cross-linking agent can be a chemical product consisting of peroxide and sulfur, in addition to the accelerators, such as TMTD, TMTM, and MBTS.

The cross-linking process is fully chemical. The reaction is homolytic. The cross-linking agent reacts at temperatures corresponding to polypropylene transformation and mixing temperatures. The macro molecular chains of the polypropylene are cross-linked by bridges mainly made of sulfur. The bridges can be a sulfur atom S1, a polysulfide Sx or a sulfur cyclic compound.

The method entails using an initiation reaction caused by the peroxide radical to form macro radicals. A propagation reaction with sulfur occurs whereby covalent bonds are created. The propagation reaction takes place before the quick stop of these macro radicals since the macro radicals have a very short lifetime. The peroxide radical ensures the macro radical formation, while the sulfur causes the reaction of joining macromolecular chains through the formation of a heat stable three-dimensional network. The addition of a single accelerator or a mixture of accelerators and sulfur is sometimes required in order to ensure the two reactions, the formation of macro radicals and the coupling reaction, occur simultaneously.

The macro radical formed has a life span that depends on the type of peroxide used. The peroxide can be a mixture of peroxides that can lengthen the life of the macro radicals. In addition, the combinations of several types of accelerators significantly improve the speed of activation of sulfur. The working principle of this couple or cross-linking agents is to make all macro radicals react simultaneously with sulfur.

The simultaneous reactions ensure that the cross-linking is optimal for each formulation.

The optimization of the degree of cross-linking depends on the efficiency of the peroxide radical and sulfur speed of activation. The efficiency of the peroxide radical and sulfur speed of activation is considered in relation to the transformation temperature and the specific characteristics and performances of the extruder. The degree of cross-linking is based upon the concentration of the cross-linkable couple that, in turn, is based upon the mass ratio of the components. For example, the degree of cross-linking is based is based upon the concentration of peroxide in relation to sulfur and the concentration of the accelerator in relation to sulfur. Peroxide can be used in equal parts as well as in higher or lower percentage.

Several combinations have been successfully achieved up to a mass ratio of twice the sulfur mass (the peroxide used is DI (2-terl-butylperoxydopropyl) benzene (s) (mixture of isomer 1,3 and 1,4 di(2-tertbutylperoxyisopropyl) benzene) in EVA and use of equal amounts of tetramethyl thiuram disulfide (TMTD) and tetramethyl thiuram monosulfide (TMTM)). The concentration of the accelerator mix can be the same as the sulfur concentration, but can occur down to a ratio of 1:4, accelerator to sulfur concentration especially, when the extruder used for mixing is a traditional single-screw extruder with three stages.

The higher the mass concentration of the cross-linkable couple, the higher the degree of cross-linking, and, therefore, the higher the screw torque.

In general, a parallel twin-screw extruder with a high torque will generate a cross-linked polymer with a higher degree of cross-linking than that obtained by a single-screw extruder and the result is more significant when using a conical twin-screw. The preparation consists of a simple solid state mixture of polypropylene granules and powder providing an appropriate dispersion of the powder in the polymer granules. Usually, vegetable oil is added for a better fixation of the powder. The cross-linking operation has been performed for homopolymers, copolymers, polypropylene recycled or restored polymers as well as polypropylene mixed with various types of polyethylene.

Examples of usable peroxides include all types of peroxide with temperatures of decomposition over 100 degrees Celsius. Accelerators with activation temperatures over 140 degrees Celsius can be used. In order to manufacture a cross-linked product, a compromise between the cross-linking time and the residence time in the extruder should be established.

Examples of usable elastomer include any macromolecular material that returns rapidly to approximately the initial dimensions and shape after substantial deformation by a weak stress and release of the stress. Examples of elastomer can include possible thermoplastics and reprocessable thermoplastics. Elastomer includes the concept that it is a composition which possesses the property of forcibly retracting after being greatly distorted. The degree of distortion which a composition can withstand to be properly classified as an elastomer has not been rigorously defined, but in general, is regarded to be at least 100%. An elastomer can be a styrene-butadiene rubber.

Polymer monomer can be a polyolefin resin.

The analysis of dynamic rheology using a plastograph facilitates the monitoring and control of the degree of cross-linking and the formation of interpenetrating networks such as incompatible mixes such as polypropylene and various types of polyethylene.

The embodiments relate to methods for making cross-linked isotactic polymer. The methods entail mixing monomer of ethylene with monomer of propylene forming a mixture. The mixture is heated while adding an accelerator, such as TMTD, TMTM or MBTS. A small amount of sulfur is added to the heated mixture. A small amount of peroxide is added to the heated mixture. The mixture is heated further to an activation temperature greater than 140 degrees Celsius. The methods then entail extruding the mixture.

Example 1: A 1:1 mixture of polypropylene and polyethylene were subjected to the embodied methods in a plastograph room of 30 ml, at a temperature of 180 degrees Celsius, with a extruder torque of 60 turns/min. The couple concentrations were as follows: peroxide 2%, sulfur 2% and TMDT 0.5% in the polymer mass used. The overall polymer mass was 28 grams. The maximum cross-linking time was three minutes at a torque over 1,600 Kgf.m.

While these embodiments have been described with emphasis on the preferred embodiments, it should be understood that within the scope of the appended claims, the embodiments might be practiced other than as specifically described herein.

What is claimed is:

1. A method for making a recyclable cross-linked isotactic polymer comprising:
   a. mixing monomer of ethylene with monomer of propylene with a catalyst to polymerize the monomer of propylene with the monomer of ethylene;
   b. heating to a temperature less than 140 degrees Centigrade while adding an accelerator selected from the group consisting of: TMTD, TMTM, MBTS, and mixtures thereof;
   c. adding a small amount of sulfur to the heated mixture, wherein the mass ratio of accelerator to sulfur ranges from about 1:1 to about 1:4;
   d. adding a small amount of peroxide to the heated mixture and further heating the mixture to a temperature greater than 140 degrees Celsius initiating cross-linking with the peroxide while using the accelerator to partially inhibit the cross-linking, wherein the accelerator ensures that the cross-linking and formation of sulfur bridges occurs simultaneously; and
   e. mixing the mixture for a time ranging from one minute to ten minutes and extruding the mixture.

* * * * *